Figure 1:
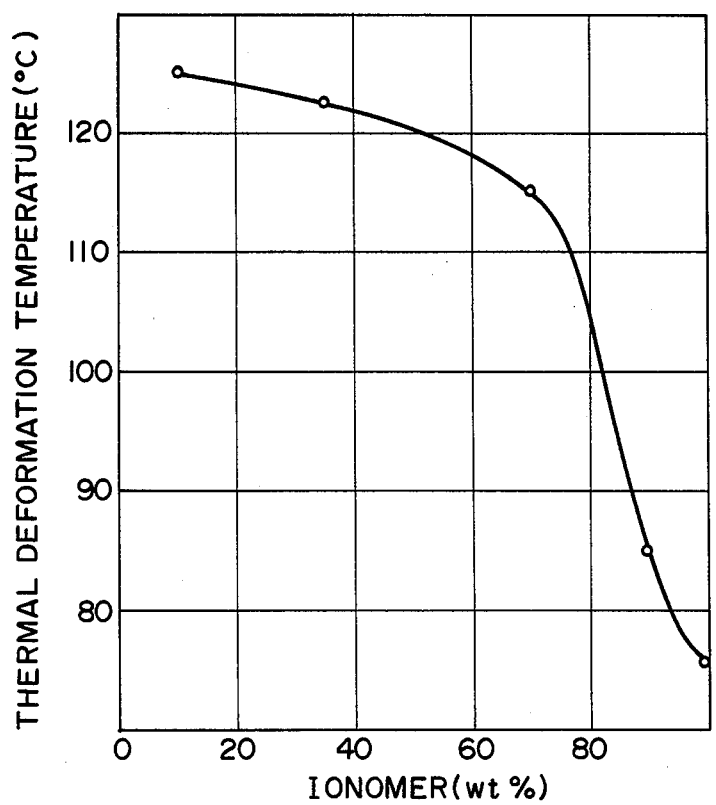

United States Patent [19]
Watanabe et al.

[11] 4,102,829
[45] Jul. 25, 1978

[54] FOAMED THERMOPLASTIC RESIN COMPRISING A MIXTURE OF IONOMER AND POLYOLEFIN

[75] Inventors: Seizaburo Watanabe; Eiji Hattori; Kanau Mori, all of Suzuka, Japan

[73] Assignee: Asahi-Dow Limited, Tokyo, Japan

[21] Appl. No.: 692,875

[22] Filed: Jun. 4, 1976

[30] Foreign Application Priority Data

Jun. 21, 1975 [JP] Japan .................................. 50/75809

[51] Int. Cl.² .............................................. C08G 18/14
[52] U.S. Cl. ........................................ 521/81; 521/98; 521/134
[58] Field of Search ................................... 260/2.5 HA

[56] References Cited

U.S. PATENT DOCUMENTS

| | | | |
|---|---|---|---|
| 3,544,490 | 12/1970 | Alexander et al. | 260/2.5 HA |
| 3,627,703 | 12/1971 | Kojima et al. | 260/2.5 HA |
| 3,867,319 | 2/1975 | Lundberg | 260/2.5 HA |
| 3,947,387 | 3/1976 | Lundberg | 260/2.5 HA |
| 4,002,581 | 1/1977 | Dolce | 260/2.5 HA |

*Primary Examiner*—M. J. Welsh
*Attorney, Agent, or Firm*—Cooper, Dunham, Clark, Griffin & Moran

[57] ABSTRACT

Foamed thermoplastic mixture of ionomers and polyolefin polymers are produced by extruding the mix together with a volatile blowing agent at elevated temperature and pressure. The density of the foamed products is from of 15 to 45 Kg/m³ and they satisfy the requirements of extrusion foamability, compressive strength or rigidity, thermal resistance and adhesion properties.

15 Claims, 2 Drawing Figures

FOAMED THERMOPLASTIC RESIN COMPRISING A MIXTURE OF IONOMER AND POLYOLEFIN

BACKGROUND OF THE INVENTION

It is difficult, if not impossible, to form ionomer foams with conventional extrusion apparatus operating at design throughput. The difficulty is that when a temperature suitable for extrusion foaming is reached, the pressure in the extruder is high enough to damaging the apparatus. As a result, it is necessary to decrease the extrusion volume.

The alternative is to build heavier apparatus with safety design features, and this undesirably increases production costs.

Foams produced solely from ionomer resins are generally recognized as inferior in both rigidity and thermal resistance. Foams produced solely from homo-polyolefins generally have inferior adhesion properties. Neither of the foams are satisfactory for, for example, a covering on pipes for an air conditioner which requires in balance all of the properties in addition to heat insulation property.

THE INVENTION

Methods have now been discovered by which it is possible to produce thermoplastic foamed resin products which are mixtures of ionomers and polyolefin polymers, and to do so with conventional extrusion equipment operating at designed capacity. The foams produced are characterized by low bulk density, high thermal resistance, good adhesion properties and uniform cell size. The foamed products comprise a mixture containing from 35% to 95% ionomer and from 5% to 65% polyolefin homopolymer or copolymer excluding that with ionomer, based on the weight of resin.

In the process of the invention, 100 parts by weight of a mixture of ionomer and polyolefin polymer containing the defined quantities of each are mixed with at least 5 parts by weight of a volatile blowing agent at elevated temperature and pressure, and the mix, while still at elevated temperature and pressure, extruded into a region of reduced pressure thereby to cause volatilization of the blowing agent and foaming of the mixture.

While some variation can be tolerated without adverse effect, it has been found that the best products are obtained by mixing the separate components at a temperature of from about 100° C to 250° C at a pressure of from 50 to 250 kg/cm². At temperatures and pressures appreciably below these ranges there is danger that the blowing agent will not be uniformly distributed in the resin mix with the result that there is loss of uniformity in foam structure. Temperatures and pressures above these ranges may require specially designed apparatus, with the result that some of the advantages of the invention may be lost. This is especially true with polyethylenes of high crystallinity with densities of 0.945 g/cm³ (ASTM D-1505) or higher, or isotactic polypropylene of high crystallinity.

The desirable temperature and pressure of the resin mix containing the blowing agent just prior to extrusion is from 60° C to 150° C at from 20 to 150 kg/cm². When the extrusion conditions are noticeably below these ranges, certain mixtures may fail to foam satisfactorily. When the ranges are appreciably exceeded, the foams tend to shrink on standing. A particular disadvantage of attempting to operate at pressure below the stated range is that the resin mix tends to foam within the extrusion apparatus itself, whereby the resin mix is subjected to irregular extrusion to give a deformed foamed product.

The polyolefin polymers which are employed in this invention may be selected from a wide variety of high pressure, medium pressure and low pressure process polyethylene products and isotactic polypropylene. Homopolymers are particularly useful, but copolymers of ethylene with propylene, vinyl acetate, methyl methacrylate and the like or mixtures thereof may also be employed. The melt index (ASTM D-1238-70 under condition E) of polyolefin homopolymers and copolymers utilized in this invention will be from 0.1 to 30 g/10 minutes, preferably 0.5 to 20 g/10 minutes.

The term "ionomer" as used in this description and claims means an ethylenic copolymer cross-linked with a metal ion. They are produced by any of the methods disclosed in Japanese Patent Publications No. 6810/1964, and No. 31556/1974 and to Japanese Laying-open No. 8885/1975, for example.

Typical compositions of ionomer may be represented by the following generic formula:

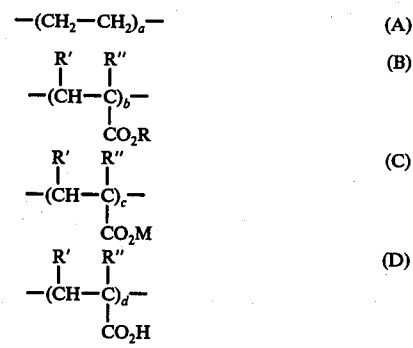

wherein:
(A) is an ethylene monomer unit.
(B) is a monomer unit of an ester of an unsaturated carboxylic acid suitably containing four to ten carbon atoms.
(C) is a monomer unit of a metal salt of an unsaturated carboxylic acid suitably containing three to nine carbon atoms.
(D) is a monomer unit of an unsaturated carboxylic acid suitably containing three to nine carbon atoms.

In the formula, R is a lower alkyl group such as methyl, ethyl or propyl, M is Na, Ca, Zn or another similar metal, R' and R" are each a hydrogen atom or methyl group, and $a$, $b$, $c$ and $d$ each indicate the mol percentage of the relevant monomer unit present in the copolymer. Preferably, $a$ is 50 – 97 mol% and $b$ is 0 – 30 mol%, otherwise uniform foam is hardly produced after extrusion. M, $a$, $b$, $c$ and $d$ values are easily observed by an infrared spectro-photomer.

The neutrality of an ionomer, N, is defined as follows:

$$N (\text{mol \%}) = c/(c + d) \times 100$$

The degree of saponification, S, is defined by the following equation:

$$S (\text{mol \%}) = (c + d)/(b + c + d) \times 100$$

When the N value is not more than 100% there are improved adhesive properties on the surface of the foam. This may be because of the carboxylic acid group present in the ionomer. For the products of this invention, best results are realized when the N value of the ionomer is up to 50%, preferably up to 10%.

The saponification value S of the ionomers utilizable in this invention will be at least 50%, and preferably at least 70%. The value of S may be 100%, when $b$ value is zero.

The melt index of the ionomers (ASTM D-1238-70 under condition E) useful in the invention will normally be from 0.1 to 50 g/10 minutes. Uniform mixture of the components and homogeneous formation of the foam are obtained more easily when the melt index falls in the range of 0.3 to 10 g/10 minutes. When the MI appreciably exceeds 50 g/10 minutes, the foam produced does not have uniform, discrete cells, and is inferior with respect to rigidity, surface conditions and adhesive properties. When the melt index is noticeably below 0.1 g/10 minutes, the foam produced may not have uniform cells and exhibits degraded adhesive properties.

As aforesaid, the most suitable products of this invention will contain from 5% by weight to 65% by weight of polyolefin polymer, based on the total weight of resin. The advantages of the invention are not fully realized, especially in that the extruder cannot be operated at full capacity, and in that the thermal resistance of the foam is not satisfactory. This is true, particularly when the amount of polyolefin is lower than 5%. If the amount of polyolefin polymer is too high, there is heavy shrinkage of the foam after it is formed and the surface adhesion properties are adversely affected.

Optimum results are achieved when the weight percent of polyolefin is from 20% to 60%, and when the polyolefin is high density polyethylene or isotactic polypropylene.

Notwithstanding that the foam obtained by the method of the present invention is produced from a mixture incorporating high density polyethylene and ionomer which is a substance of low thermal resistance, it has been unexpectedly found that the foam products of the invention experience little decline in the thermal resistance. The deflection temperature of the foam as the function of the ionomer content resin mix is graphically represented in FIG. 1. It is clearly seen from this graph that degradation of thermal resistance in the foam is lowest when the ionomer content is less than 70 percent by weight.

Figure 2:
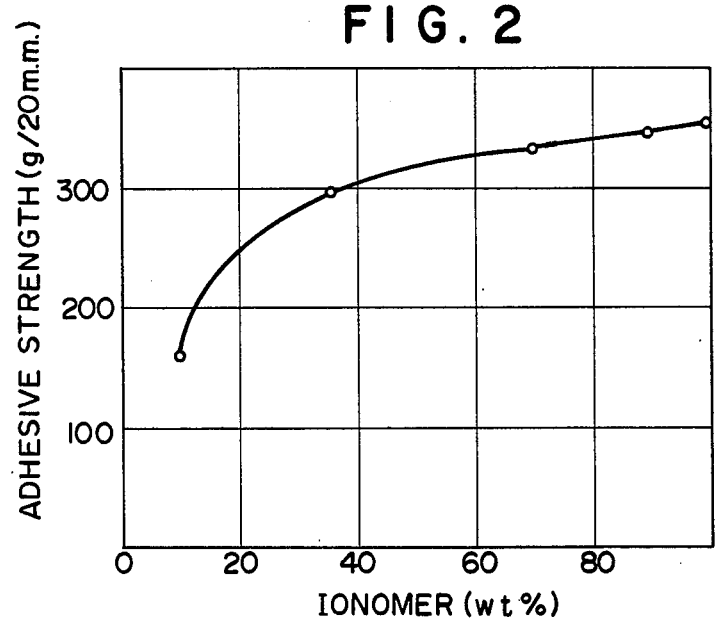

In spite of the inclusion of polyethylenes normally manifesting low adhesion properties, the foams obtained by the present invention have good adhesive properties even when they contain a high proportion of a polyethylene polymer. FIG. 2 is a graph showing the increase in adhesion strength with increasing ionomer content of the resin mixture. It is evident from this graph that best adhesion is obtained when the ionomer content in the mixture exceeds 35 percent by weight.

The blowing agents most useful in this invention are aliphatic hydrocarbon and halogenated hydrocarbons of the class which can be maintained as a liquid even at relatively high temperatures when they are kept under high pressure, and will rapidly volatilize without decomposing when the pressure is released. The preferred agents are those with a boiling point of from −30° C to 100° C under standard conditions. Typical examples of useful organic blowing agents are propane, butane, pentane, cyclopentane, cyclohexane, methyl chloride, ethyl chloride, methylene chloride, dichlorodifluoromethane, 1,2-dichloro-1,1',2,2'-tetrafluoroethane and monochlorotrifluoromethane.

It has been observed that the amount of blowing agent in the foamable mixtures employed in the invention should be at least 5 parts by weight per 100 parts by weight of resin in order to obtain the advantages of the invention. As a practical matter it is rarely necessary to exceed 100 parts by weight blowing agents per 100 parts by weight resin.

If the amount of blowing agent employed is appreciably less than 5 parts by weight, there is an abnormal increase in extrusion pressure and thus one of the chief advantages of the invention is lost. Additionally, with such small amounts of blowing agents it is difficult to obtain a uniform mix and therefore the foamed products produced are not homogeneous and their desirable properties are not achieved.

Chemical blowing agents which achieve their effect by thermal decomposition are generally not suitable for use in this invention. These chemical blowing agents in the course of performing their function generate gases such as nitrogen and carbon dioxide which have extremely low boiling points under normal pressure. It is especially difficult to prevent thermal decomposition of such blowing agents under the conditions of this invention. As a result, the blowing agents tend to decompose and vaporize prematurely with the result that the extruded foam tends to shrink on standing, there is breakage of the cell walls and the continuity of the extruded foam is impaired, particularly when foams having density from 15 to 45 kg/m$^3$ are intended. As an example, repetition of the procedure of Example 1 using 5 parts by weight per 100 parts by weight of resin of the chemical blowing agent azodicarbonamide led to the production of extruded foam with heavily ruptured cell walls which could not be extruded continuously and therefore lacked homogeneity.

The process of the present invention can be carried out in the presence of the usual additives generally employed in the production of foamed products. These include, for example, cell diameter regulators, foam stabilizers, flame retardants and coloring agents. Such products are utilized in the amounts normally employed with conventional foams.

The following non-limiting examples are given by way of illustration only. In the examples the following terms should be understood as defined below.

(1) Bulk density (Kg/m$^3$) is a value of weight (Kg) of a foamed product divided by volume (m$^3$).
(2) Mean cell diameter (mm) is average value of diameters of cells all contained in a 100 cm$^2$ cross-section of a foamed product.
(3) The "25% compressive strength," which may be considered as an index for the rigidity of a foam, is the magnitude of the stress in kg/cm$^2$ which occurs in a cube of the foam measuring 50 × 50 × 50 mm at normal room temperature after said foam has been compressed by 25% of the original thickness at a deforming velocity of 12.5 mm/min.
(4) The "thermal deformation temperature" is the temperature (° C) at which the volume change ratio of a foam after one hour's standing in an oven kept at that temperature is 95% or less.

$$\text{Volume change ratio} = V_1/V_0 \times 100$$

wherein, $V_0$ stands for the initial volume of the foam and $V_1$ for the volume the foam assumes after 1 hour's standing in the heated oven.

The thermal deformation temperature is a measure of thermal resistance. The higher the temperature, the greater the thermal resistance.

This temperature also serves as an index for the thermal resistance of the foam.

(5) The "adhesive strength" is the magnitude of stress in g/20 mm which occurs when a strip of flexible plastic adhesive tape 15 mm in width coated with an acrylic adhesive agent spread to a thickness of 40 g/m$^2$ is adhered to the foam surface and peeled from the surface to 180° at a strain velocity of 200 mm/min. at normal room temperature.

From the practical point of view, it is generally considered that the compressive strength of useful foams should be 1.0 to 3.0 Kg/cm$^2$ and the adhesive strength should exceed 150 g/20 mm, preferably 200 g/20 mm. Foams of homopolyolefin have adhesive strength of less than 150 g/20 mm.

EXAMPLE 1

A mixture consisting of 70 percent by weight of ionomer (Surlyn A/1706 (MI 0.6, $b$ value 0%, Zn 3.48 weight%, N value 44 mol%, S value 100 mol%) made by E. I. duPont de Nemours & Co.) and 30 percent by weight of high-density polyethylene (Sunteck S-360 (MI 1.0) made by Asahi Chemical Industry Co., Ltd.) was formed. A total of 100 parts by weight of this resin mixture was compounded with 0.5 part by weight of talc and 0.4 part by weight of zinc stearate and fed to an extruder with the first zone kept at 120° C, the second zone at 210° C and the third zone at 240° C, and having a screw diameter of 30 mm. Through an injection inlet situated in the middle of the third zone, a mixed blowing agent containing 70 percent by weight of dichlorodifluoromethane and 30 percent by weight of trichloromonofluoromethane was forced under pressure into the mix at a weight ratio of 18 parts of the blowing agent to 100 parts of the resin. The resultant blend was extruded into a low pressure zone through a die with a diameter of 3.0 mm disposed at the leading end of a temperature regulator at a resin temperature of 123° C. The pressure at which the blowing agent was forced into the resin mix was 170 kg/cm$^2$, and the resin pressure immediately in front of the die was 35 kg/cm$^2$. The rate of extrusion was 3.3 kg/hour which was the maximum capacity of the extruder.

The properties of the foam are shown in the table.

EXAMPLE 2

The procedure of Example 1 was repeated, except that the resin mix contained 35 percent by weight of the same ionomer and 65 percent by weight of the same high-density polyethylene used in Example 1.

The pressure at which the blowing agent was forced into the resin mix was 142 kg/cm$^2$, and the pressure in the foaming area was the same as in Example 1. The rate of extrusion was 3.3 kg/hour.

The properties of the foam product appear in the table.

EXAMPLE 3

The procedure of Example 1 was followed, except that the resin mix contained 90 percent by weight of ionomer (Surlyn A 1601; MI 1.2; $b$ value 0%; Na 1.31 weight%; N value 35.0 mol%; S value 100 mol%; made by E. I. duPont de Nemours & Co.) and 10 percent by weight of high-density polyethylene (Sunteck S-360 made by Asahi Chemical Industry Co., Ltd.), and the blowing agent contained 80 percent by weight of dichlorotetrafluoroethane and 20 percent by weight of methylene chloride. The first zone of the extruder was kept at 110° C, the second zone at 190° C, and the third zone at 200° C respectively, and the temperature of the resin blend immediately before extrusion was adjusted to 91° C. The pressure at which the blowing agent was introduced was 190 kg/cm$^2$ and the rate of extrusion was 3.3 kg/hour.

The properties of the foamed product appear in the table.

EXAMPLE 4

The procedure of Example 1 was followed with a resin mix containing 40 percent by weight of ionomer (Surlyn A 1652 (MI 5.5; $b$ value 0%; Zn 0.5 weight%; N value 10.3; S value 100 mol%) made by E. I. duPont de Nemours & Co.) and 60 percent by weight of low-density polyethylene (F 2130 (MI 3.0) made by Asahi-Dow Limited). The first zone of the extruder was kept at 90° C, the second zone at 160° C, and the third zone at 190° C, respectively, and the temperature at which the resin blend was extruded into the low-pressure zone was adjusted at 107° C.

The pressure at which the blowing agent was introduced was 105 kg/cm$^2$, and the pressure of the resin immediately in front of the die was 30 kg/cm$^2$. The rate of extrusion was 3.3 kg/hour which was the maximum capacity of the extruder.

The properties of the foam are shown in the table.

EXAMPLE 5

The procedure of Example 1 was repeated, except an experimental ionomer (MI 3.0; $a$ value 60 mol%; $b$ value 20 mol%; S value 90%; and N value 5%) manufactured by Asahi-Dow Limited, was used in place of the ionomer Surlyn.

The pressure at which the blowing agent was introduced was 185 kg/cm$^2$ and the pressure of the resin immediately in front of the die was 32 kg/cm$^2$. The rate of extrusion was 3.2 kg/hour.

The properties of the foam are shown in the table.

EXAMPLE 6

A mixture consisting of 40 percent by weight of ionomer made by Asahi-Dow Ltd. (MI 1.2; $a$ value 60 mol%; $b$ value 10 mol%; N value 20 mol% and $S$ value 70 mol%) and 60 percent by weight of isotactic polypropylene (Mitsui polypro J-301 (MI 1.0) made by Mitsui Petroleum Chemical Co., Ltd.) was formed. A total of 100 parts by weight of this resin mixture was compounded with 0.5 part by weight of talc and 2.0 parts by weight of zinc stearate and fed to an extruder with the first zone kept at 130° C, the second zone at 230° C and the third zone at 250° C, and having a screw diameter of 30 mm. Through an injection inlet situated in the middle of the third zone, a blowing agent of dichlorodifluoromethane was forced under pressure into the mixture at a weight ratio of 45 parts by weight of the blowing agent to 100 parts by weight of the resin. The resultant blend was extruded into an atmosphere through a die with a diameter of 3.0 mm disposed at the leading end of the extruder at a resin temperature of 147° C. The pressure at which the blowing agent was forced into the resin mix was 150 kg/cm$^2$, and the resin pressure immediately in front of the die was 70 kg/cm$^2$. The rate of extrusion was 3.3 kg/hour which was the maximum capacity of the extruder.

The properties of the foam are shown in the table.

COMPARATIVE EXAMPLE 1

The procedure of Example 1 was repeated, except ionomer (Surlyn A 1706 (MI 0.6) made by E. I. duPont de Nemours & Co.) alone was used as the base resin.

COMPARATIVE EXAMPLE 4

The procedure of Comparative Example 3 was repeated except the weight ratio of the blowing agent was changed to 45 parts by weight.

Properties of the foam are shown in the table.

| EXAMPLE | SURFACE | BULK DENSITY kg/m$^3$ | CELL APPEARANCE | CELL AVERAGE DIAMETER mm | 25% COM-PRESSIVE STRENGTH kg/cm$^2$ | THERMAL DEFORMATION Temp. °C | ADHESIVE STRENGTH g/20 mm |
|---|---|---|---|---|---|---|---|
| 1 | Smooth | 26 | Uniform | 0.5 | 1.50 | 116 | 320 |
| 2 | Smooth | 29 | Uniform | 0.7 | 1.80 | 122 | 295 |
| 3 | Smooth | 39 | Uniform | 0.6 | 1.05 | 85 | 340 |
| 4 | Slightly Wrinkled | 30 | Uniform | 0.6 | 1.20 | 83 | 300 |
| 5 | Smooth | 45 | Uniform | 0.7 | 1.45 | 115 | 460 |
| 6 | Smooth | 17 | Uniform | 0.5 | 1.08 | 132 | 360 |
| Comp. 1 | Smooth | 33 | Uniform | 0.7 | 0.86 | 66 | 350 |
| Comp. 2 | Rough | 31 | Not uniform, Large area broken | about 0.3 | 0.96 | 126 | 160 |
| Comp. 3 | Greatly Wrinkled | about 58 | Not uniform | —* | —* | —* | —* |
| Comp. 4 | Greatly Wrinkled | —** | Broken | —** | —** | —** | —** |

Notes:
*Properties could not be observed, because of severe shrinkage.
**Properties could not be observed because of severe shrinkage, although foam with bulk density of less than 45 kg/m$^3$ was intended to obtain.

The first zone of the extruder was kept at 80° C, the second zone at 150° C, and the third zone at 180° C, respectively, and the temperature of the resin at which the resin blend was extruded into the low-pressure zone was adjusted to 96° C.

The pressure at which the blowing agent was introduced rose to exceed the pressure limit of the extruder (210 kg/cm$^2$), with the result that the safety device was actuated to discontinue the extrusion foaming operation. To resume the operation it was necessary to lower the original rate of extrusion to 1.3 kg/hour.

Consequently, the pressure at which the blowing agent was introduced was 175 kg/cm$^2$ and the pressure of the resin blend immediately in front of the die was 48 kg/cm$^2$.

The properties of the foam are shown in the table.

COMPARATIVE EXAMPLE 2

The procedure of Example 1 was repeated, except a mixture consisting of 10 percent by weight of the same ionomer and 90 percent by weight of the same high-density polyethylene as used in Example 1 was used as the base resin mix.

The pressure at which the blowing agent was introduced was 135 kg/cm$^2$, and the rate of extrusion was 3.3 kg/hour.

The properties of the foam are given in the table.

COMPARATIVE EXAMPLE 3

The procedure of Example 1 was repeated, except ethylene-vinyl acetate copolymer (Ebatate H-1010; MI 0.6; Density 0.94 g/cm$^3$; vinyl acetate value 15 percent by weight; made by Sumitomo Chemical Co., Ltd.) was used in place of the ionomer.

The pressure at which the blowing agent was introduced was 160 kg/cm$^2$, the resin pressure immediately in front of the die was 38 kg/cm$^2$ and the rate of extrusion was 3.3 kg/hour.

Properties of the foam are shown in the table.

From the examples, the comparative examples, and the table it can be seen that by operating in accordance with this invention it is possible to produce low-density foams with uniform cell structure at high extrusion rates. The foams produced are characterized by high thermal resistance and good adhesion properties.

Similar results are obtained by mixing and extruding, in the above defined process parameters, other ionomers and polyethylene homopolymers and copolymers, specifically copolymers of ethylene with vinyl acetate, propylene and methyl methacrylate, and polypropylene.

The commercial advantages of this invention will be readily apparent to those skilled in the art. The invention makes it possible to produce excellent quality ionomerpolyolefin foams operating at maximum extruder capacity without the additional costs of producing special extruder apparatus.

What is claimed is:

1. A thermoplastic foamed resin product characterized by low density, high thermal resistance, good adhesion properties and uniform cell size which comprises a mixture containing from 35% to 95% ionomer characterized by the presence of a monomer unit based on an unsaturated carboxylic acid and 5% to 65% polyolefin polymer or copolymer, based on the total weight of resin; the ethylene monomer unit and unsaturated carboxylic acid ester monomer unit values of the ionomer being from 50 to 97 mol% and up to 30 mol%; respectively, the neutrality value of the ionomer being up to 50%, the saponification value of the ionomer being at least 50%, and the melt index of the ionomer being from 0.1 to 50 g/10 min.; the melt index of the polyolefin being from 0.1 to 30 g/10 min.

2. A product as in claim 1 wherein the neutrality value of the ionomer is up to 10% and the saponification value is at least 70%.

3. A product as in claim 1 wherein the melt index of the ionomer is from 0.3 to 10 g/10 min., and of the polyolefin is from 0.5 to 20 g/10 min.

4. A product as in claim 1 wherein the polyolefin is selected from the group consisting of high pressure, medium pressure and low pressure process polyethylene homopolymers, and isotactic polypropylene.

5. A product as in claim 1 wherein the carboxylic acid of the ionomer contains from 4 to 10 carbon atoms.

6. A product as in claim 1 wherein the polyolefin is a copolymer selected from the group consisting of copolymers of ethylene with a comonomer selected from the group consisting of propylene, vinyl acetate and methyl methacrylate.

7. A product as in claim 1 wherein the mixture consists of 80 to 40 percent by weight of the ionomer and 20 to 60 percent by weight of polyolefin selected from the group consisting of medium pressure and low pressure process polyethylene homopolymers and isotactic polypropylene.

8. A product as in claim 1 wherein the bulk density is from 15 to 45 kg/m$^3$.

9. A process for the production of a thermoplastic foamed resin product characterized by low density, high thermal resistance, good adhesion properties and uniform cell size which comprises a mixture containing 35% to 95% ionomer characterized by the presence of a monomer unit based on an unsaturated carboxylic acid and 5% to 65% polyolefin homopolymer or copolymer, based on the total weight of resin; ethylene monomer unit and unsaturated carboxylic acid ester monomer unit values of the ionomer being from 50 to 97 mol% and up to 30 mol%, respectively, the neutrality value of the ionomer being up to 50%, the saponification value of the ionomer being from 0.1 to 50 g/10 min.; the melt index of the polyolefin being from 0.1 to 30 g/10 min.: which process comprises the steps of:

1. mixing the ionomer with a volatile blowing agent and the polyolefin at a temperature of from 100° C to 250° C and a pressure of from 50 to 250 kg/cm$^2$, weight ratio of the blowing agent to polyolefin being at least 5 parts to 100 parts, and 2. extruding the mixture at a temperature of from 60° C to 150° C and a pressure of 20 to 150 kg/cm$^2$ into a region of reduced pressure thereby to cause volatilization of the blowing agent and foaming of the mixture.

10. A process as in claim 9 wherein the volatile blowing agent is a hydrocarbon or halogenated hydrocarbon, with a boiling point from 30° C below zero to 100° C at normal pressure.

11. A process as in claim 9 wherein the neutrality value of the ionomer is up to 10% and the saponification value is at least 70%.

12. A process as in claim 9 wherein the melt index of the ionomer is from 0.3 to 10 g/10 min., and of the polyolefin is from 0.5 to 20 g/10 min.

13. A process as in claim 9 wherein the polyolefin is selected from the group consisting of medium pressure and low pressure process polyethylene polymers, and isotactic polypropylene.

14. A process as in claim 9 wherein the polyolefin is a copolymer selected from the group consisting of copolymers of ethylene with a comonomer selected from the group consisting of propylene, vinyl acetate and methyl methacrylate.

15. A process as in claim 9 wherein the unsaturated carboxylic acid contains from 4 to 10 carbon atoms.

* * * * *

UNITED STATES PATENT AND TRADEMARK OFFICE
CERTIFICATE OF CORRECTION

PATENT NO. : 4,102,829
DATED : July 25, 1978
INVENTOR(S) : Seizaburo Watanabe et al.

It is certified that error appears in the above-identified patent and that said Letters Patent are hereby corrected as shown below:

Column 8, line 53, (Claim 1, line 8)
"ethylene" should read -- olefin --;

Column 9, line 25, (Claim 9, line 8)
"ethylene" should read -- olefin --.

Signed and Sealed this

Sixteenth Day of January 1979

[SEAL]

Attest:

RUTH C. MASON
*Attesting Officer*

DONALD W. BANNER
*Commissioner of Patents and Trademarks*